(12) United States Patent
Zainaldin et al.

(10) Patent No.: US 9,848,379 B2
(45) Date of Patent: Dec. 19, 2017

(54) CASCADED RADIO COMMUNICATION SYSTEM

(71) Applicant: Telefonaktiebolaget LM Ericsson (publ), Stockholm (SE)

(72) Inventors: Ahmed Zainaldin, Nepean (CA); Najeh Abu-Farha, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 604 days.

(21) Appl. No.: 14/492,962

(22) Filed: Sep. 22, 2014

(65) Prior Publication Data

US 2016/0087446 A1 Mar. 24, 2016

(51) Int. Cl.
*H01F 38/14* (2006.01)
*H04W 52/00* (2009.01)
*H04L 12/10* (2006.01)
*H04W 88/04* (2009.01)

(52) U.S. Cl.
CPC ............ *H04W 52/00* (2013.01); *H04L 12/10* (2013.01); *H04W 88/04* (2013.01)

(58) Field of Classification Search
CPC ............................... H04W 88/04; H01F 38/14
See application file for complete search history.

(56) References Cited

U.S. PATENT DOCUMENTS

| | | |
|---|---|---|
| 8,261,001 B2 | 9/2012 | Bobrek |
| 2006/0273661 A1 | 12/2006 | Toebes et al. |
| 2010/0274927 A1* | 10/2010 | Bobrek .................. G06F 1/266 709/250 |
| 2011/0163605 A1 | 7/2011 | Ronen et al. |
| 2012/0254639 A1 | 10/2012 | Masuda et al. |
| 2013/0339760 A1 | 12/2013 | Zimmerman et al. |

FOREIGN PATENT DOCUMENTS

WO 2006052359 A2 5/2006

OTHER PUBLICATIONS

Written Opinion of the International Preliminary Examining Authority dated Aug. 16, 2016 for International Application No. PCT/IB2014/064744, International Filing Date: Sep. 22, 2014 consisting of 5-pages.
International Search Report and Written Opinion dated Dec. 9, 2014 for International Application No. PCT/IB2014/064744, International Filing Date: Sep. 22, 2014 consisting of 12-pages.
PCT Notification of Transmittal of International Preliminary Report on Patentability, Form/PCT/IPEA/416, dated Dec. 20, 2016 for corresponding International Application No. PCT/IB2014/064744, I International Filing Date: Sep. 22, 2014 consisting of 47-pages.

* cited by examiner

*Primary Examiner* — Rexford Barnie
*Assistant Examiner* — Terrence Willoughby
(74) *Attorney, Agent, or Firm* — Christopher & Weisberg, P.A.

(57) ABSTRACT

A method and system for extending the range and coverage of wireless radio systems through the introduction of cascade devices are disclosed. In some embodiments, power allocations from a first power sourcing equipment (PSE) to a radio device are negotiated by an intervening cascade device. Also, OAM configurations of a radio controller are extended to radio devices via the intervening cascade device.

19 Claims, 9 Drawing Sheets

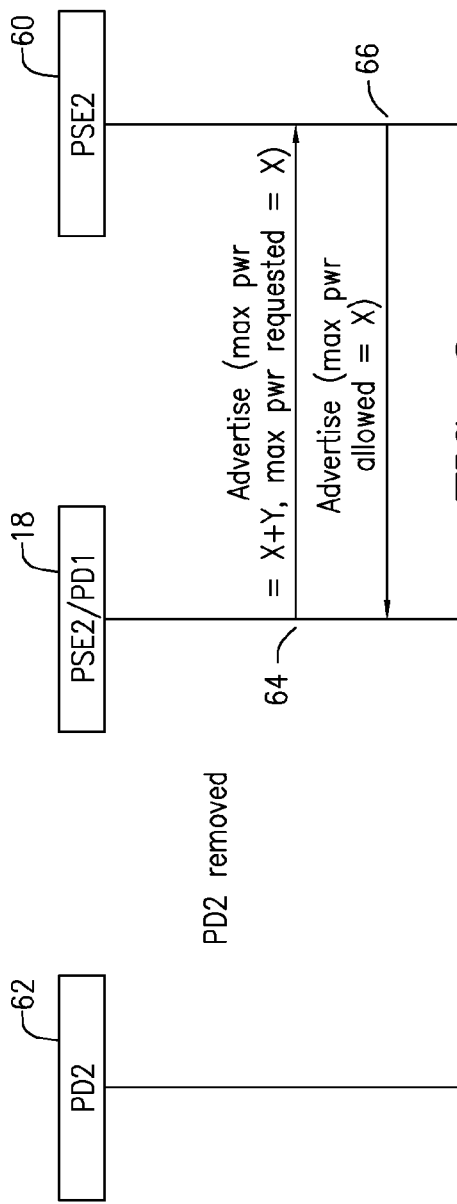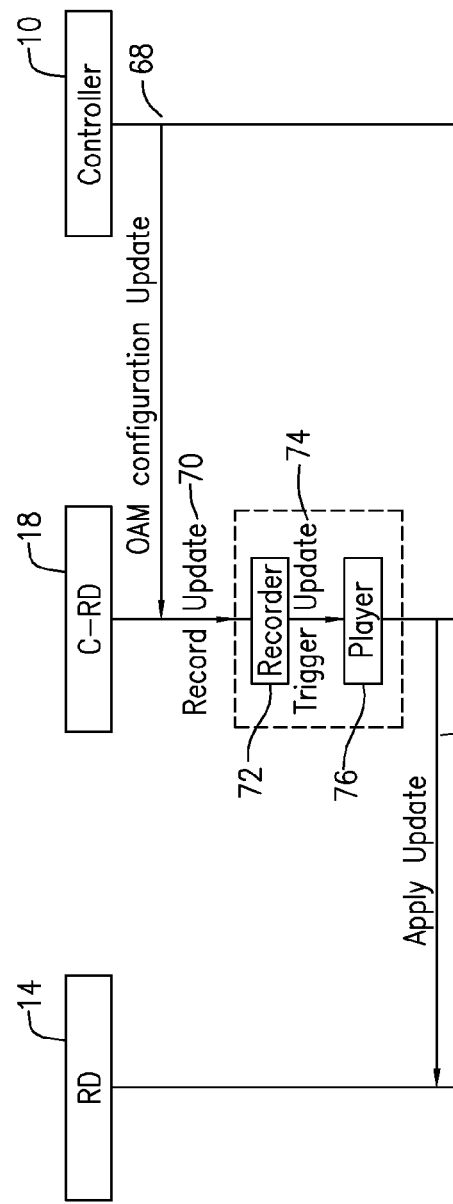

CASCADED RADIO COMMUNICATION SYSTEM

TECHNICAL FIELD

A method, system and device for extending the range and coverage of wireless radio systems are disclosed.

BACKGROUND

Current wireless communication network solutions, especially those used for indoor networks, include a radio controller which provides power and signaling over an Ethernet cable to and from a radio. This is shown in FIG. 1, where the radio controller (RC) 10 is connected to a backhaul network via a digital baseband unit (DU) 12 via a common public radio interface (CPRI) which may include a fiber connection. The radio controller 10 acts as a power sourcing equipment (PSE) to feed power to the radio device 13 over an Ethernet cable such as CAT 5, 6 or 7 that is ANSI-TIA-EIA 568 compliant. The radio controller 10 also supports communication with the radio device 13 over the Ethernet cable. Power can be delivered on such a cable to a radio unit up to about 200 meters away from the radio controller 10. The radio device 13 is a powered device (PD) that acts as a wireless access point to communicate wirelessly with user equipment (UE) such as mobile phones 11.

There are several common techniques for transmitting power over Ethernet cabling of which two have been standardized under Institute of Electrical and Electronic Engineers (IEEE) specification 802.3af and IEEE 802.3at. FIG. 2 is a schematic of a power sourcing equipment, such as the radio controller 10, which feeds power to, and supports communication with, a powered device, such as the radio device 13. In FIG. 2, power is transmitted on pairs 4/5 and 7/8, while communication such as data and signaling is carried on pairs 1/2 and 3/6. In another embodiment, since only two of the four pairs are needed for communication using IEEE 802.3 10/100 BASE-T, power may be transmitted on the same wiring pairs as the data communication. In this case power may be transmitted on the conductors carrying data and control signals by applying a common-mode voltage to each pair. Because Ethernet uses differential signaling, this does not interfere with data transmission. The common mode voltage is easily extracted using the center tap of the standard Ethernet pulse transformer.

In addition to standardizing existing practice for spare-pair and common-mode data pair power transmission, the IEEE Power over Ethernet (PoE) standards provide for signaling between the PSE and PD. This signaling allows the presence of a conformant device to be detected by the power source, and allows the device and source to negotiate the amount of power required or available.

As noted above, in current solutions, the radio device 13 can only be a maximum distance of about 200 meters from the radio controller 10. The maximum allowed continuous output power per cable in IEEE 802.3af is 15.40 Watt. Specification IEEE 802.3at establishes a 25.50 Watt capability.

SUMMARY

The present disclosure advantageously provides a method and system for negotiating power allocations provided via an Ethernet cable from a power sourcing equipment (PSE) to a radio device in a manner that extends the distance between the PSE and the radio device. According to one aspect, a cascade device includes a processor and a memory. The processor is configured to negotiate power allocations from the PSE to the radio device and the cascade device. The memory is in communication with the processor and is configured to store power allocations requested by the radio device and the cascade device. The memory is also configured to store negotiated power allocations made to the radio device and the cascade device.

According to this aspect, in some embodiments, negotiating power allocations to the cascade device and the radio device includes sending to the PSE a total requested power allocation that is a sum of a power allocation requested by the radio device and a power allocation requested by the cascade device. In some embodiments, upon disconnecting the radio device, negotiating power allocations includes sending to the PSE an updated total requested power allocation, the updated total requested power allocation including the total requested power allocation minus the power allocated to the radio device. In some embodiments, negotiating power allocations includes informing the radio device of a maximum power allocated to the radio device. In some embodiments, the processor is further configured to cause the memory to save operation, administration and maintenance, OAM, configurations to be applied to the cascade device and to additional cascade devices to be connected to the cascade device. The memory is further configured to store the OAM configurations. In some embodiments, the processor is further configured to extend the OAM configurations to a next cascade device connected to the cascade device. In some embodiments, extending the OAM configurations to a next cascade device includes synchronizing the next cascade device with the cascade device.

According to another aspect, embodiments include a cascade device is configured to negotiate an amount of power to be allocated to a radio device from a power sourcing equipment, PSE. The cascade includes a power negotiation module configured to negotiate power allocations from the PSE to the radio device and the cascade device. The cascade device also includes a memory module in communication with the power negotiation module. The memory module is configured to store power allocations requested by the radio device and the cascade device and the negotiated power allocations to the radio device and the cascade device.

According to this aspect, in some embodiments, the cascade device further includes a transceiver module in communication with the processor module, the transceiver module configured to communicate with wireless devices. In some embodiments, the cascade device further includes an operations, administration and maintenance, OAM, module. The OAM module is configured to record OAM information that specifies parameters of operation of the radio device and the cascade device and forward the OAM information to the radio device upon connection of the radio device.

According to another aspect, embodiments include a system for providing power over Ethernet cables to radio devices in a wireless network to facilitate indoor wireless communications. The system includes at least one radio device (RD) a radio controller (RC) and a first cascade radio device (C-RD). The radio controller provides power on an Ethernet cable to the at least one radio device. The first C-RD is interposed between the at least one radio device and the RC, and is configured to negotiate an amount of power to be delivered by the RC to the at least one radio device.

According to this aspect, in some embodiments, the first C-RD negotiates an amount of power to be delivered by the RC to the at least one radio device by receiving at the first C-RD from the at least one radio device a first message. The first message indicates an amount of power requested by the at least one radio device. The negotiating includes sending by the first C-RD to the RC a second message. The second message indicates a total amount of requested power that is the sum of the amount of power requested by the at least one radio device and an amount of power requested by the first C-RD. In some embodiments, the negotiating further includes receiving at the first C-RD from the RC a third message. The third message indicates a maximum power allocated to the at least one radio device and a maximum power allocated to the first C-RD. The negotiating further includes transmitting by the first C-RD to the at least one radio device a fourth message, where the fourth message indicates the maximum power allocated to the at least one radio device. In some embodiments, the system further includes a second C-RD interposed between the first C-RD and the at least one radio device. The second C-RD is configured to negotiate an amount of power to be delivered by the RC to the at least one radio device and the second C-RD via the first C-RD.

In some embodiments, when one of the at least one radio device is disconnected, the negotiating further includes requesting by the first C-RD an amount of power from the RC equal to the total amount of requested power minus an amount of power previously requested by the disconnected one of the at least one radio device. In some embodiments, the first C-RD further includes an OAM extension module that is configured to: record operation, administration and maintenance, OAM, information concerning configuration of the at least one radio device; and forward the OAM information to the at least one radio device when the at least one radio device is connected to the system. In some embodiments, the first C-RD includes a radio transceiver and a power sourcing equipment. In some embodiments, the negotiating is initiated when one of the at least one radio device is first connected to the wireless network.

According to yet another aspect, embodiments include a method of negotiating power allocations provided via Ethernet cable from a first power sourcing equipment (PSE) to a radio device. The method includes negotiating by a cascade device the power allocations from the PSE made to a radio device and the cascade device. The method also includes storing at the cascade device power allocations requested by the radio device and the cascade device, and power allocations made to the radio device and the cascade device.

According to this aspect, negotiating power allocations to the cascade device and the radio device includes sending to the PSE a total requested power allocation that is a sum of a power allocation requested by the radio device and a power allocation requested by the cascade device. In some embodiments, upon disconnecting the radio device, negotiating power allocations includes sending to the PSE an updated total requested power allocation, where the updated total requested power allocation includes the total requested power allocation minus the power allocated to the radio device. In some embodiments, negotiating power allocations includes informing the radio device of a maximum power allocated to the radio device.

In some embodiments, upon connecting the radio device, negotiating power allocations to the radio device includes receiving a first message from the radio device, the first message indicating an amount of power requested by the radio device. In some embodiments, negotiating power allocations to the radio device from the first PSE includes sending by the cascade device to the first PSE a second message, where the second message indicates a total amount of power that includes the amount of power requested by the radio device. In some embodiments, the total amount of power includes a requested amount of power to be allocated to the cascade device. In some embodiments, the negotiating power allocations to the radio device from the first PSE further includes receiving at the cascade device from the first PSE a third message. The third message indicates a total allocated power that includes a maximum power allocated to the radio device and a maximum power allocated to the cascade device. The negotiating further includes transmitting by the cascade device to the radio device a fourth message, the fourth message indicating the maximum power allocated to the radio device.

In some embodiments, upon disconnection of the radio device, the negotiating includes sending by the cascade device to the first PSE a fifth message requesting a new power allocation from the first PSE. In some embodiments, the method further includes: recording by the cascade device operation, administration and maintenance, OAM, information concerning configuration of the radio device; and sending by the cascade device to the radio device the OAM information when the radio device is connected to the cascade device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 8 illustrates a process for re-negotiating power for a cascade device when a radio device is removed in accordance with principles of the present invention;

FIG. 9 illustrates a process for updating operation, administration and maintenance (OAM) information to a cascade device and radio device in accordance with principles of the present invention;

DETAILED DESCRIPTION

Figure 1:
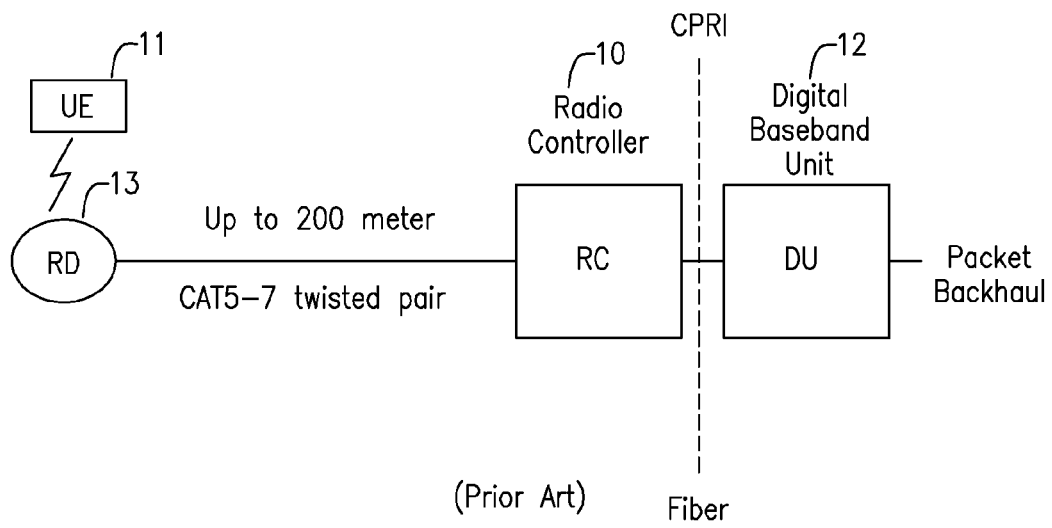
FIG. 1 is a block diagram of a known indoor radio system.
Figure 2:
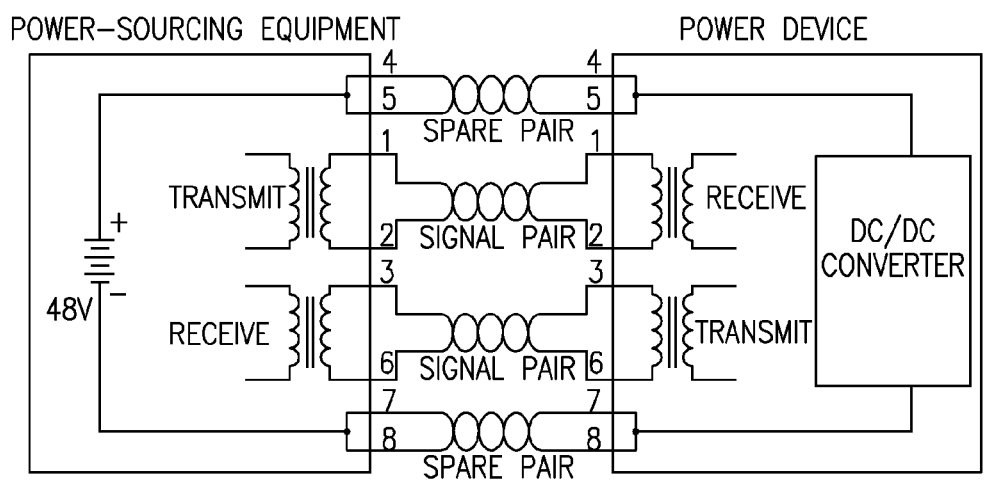
FIG. 2 is a schematic diagram of a power sourcing equipment and a power consuming device connected by Ethernet cable pairs.

Before describing in detail exemplary embodiments that are in accordance with the present disclosure, it is noted that the embodiments reside primarily in combinations of apparatus components and processing steps related providing power over Ethernet in a radio communication system. Accordingly, the device system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 3:
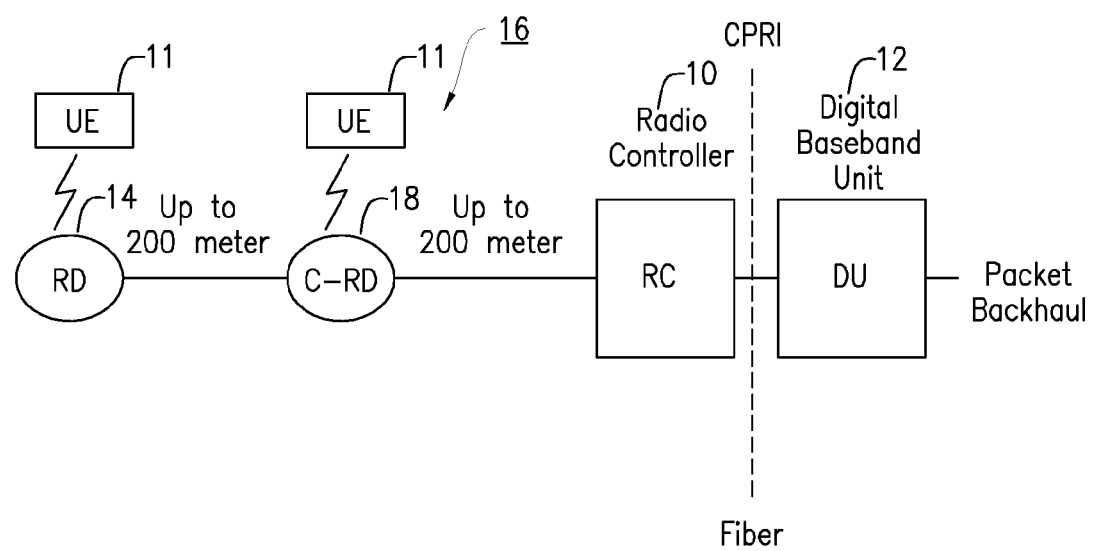
FIG. 3 is a block diagram of a radio system using a cascade device to extend the range by which power can be delivered over an Ethernet cable to a radio device constructed in accordance with principles of the present invention.

Returning now to the drawing figures, where like reference designators refer to like elements, there is shown in FIG. 3 a block diagram of a radio system 16 with a cascade device (C-RD) 18, which may or may not also include a radio, interposed between the radio device (RD) 14 and the radio controller (RC) 10. UEs 11 wirelessly communicate with RD 14 and C-RD 18. The cascade device 18 negotiates with the radio controller 10 to arrive at an amount of power to be delivered from the radio controller 10 to the radio unit 14 via the cascade device 18.

In one embodiment, the interposition of the cascade device 18 between the radio controller 10 and the radio device 14 enables an increase in the maximum distance between the radio device 14 and the radio controller 10 from about 200 meters to about 400 meters while maintaining compliance with IEEE power over Ethernet (PoE) and data communication standards. The cascade device 18 does not require local power since it is powered by the radio controller 10 over the Ethernet connection between the cascade device 18 and the radio controller 10. As will be explained below in more detail, if a longer range between the radio device 14 and the radio controller 10 is needed, additional cascade devices 18 may be interposed between the radio controller 10 and the radio device 14. Note that the system 16 can be used indoors and is suited for indoor applications since it extends range of power over Ethernet implementations, which are typically indoor installations. System 16 could readily be used in outdoor or indoor/outdoor applications that rely on power over Ethernet.

In some embodiments, the cascade device 18 includes a power amplifier to amplify an amount of power received from the radio controller 10 to be sent to the next downstream device, which may be a radio device or a cascade device with or without a radio. The cascading depth is limited only by the amount of power available from the radio controller 10. Different PoE standards are available to provide more or less power. Examples of these different PoE standards are shown in Table 1.

TABLE 1

|  | PoE | PoE Plus | UPOE |
|---|---|---|---|
| Minimum cable type | Cat5e | Cat5e | Cat5e |
| IEEE standard definition | 802.3 af | 802.3 at | Proprietary |
| Maximum power per PSE port | 15.4 W | 30 W | 60 W |

TABLE 1-continued

|  | PoE | PoE Plus | UPOE |
|---|---|---|---|
| Maximum power to PD | 12.95 W | 25.5 W | 51 W |
| Twisted pair used | 2-pair | 2-pair | 4-pair |

Installing the cascade device 18 requires no set up steps once connected. The connections include two RJ45 network ports, and the cascade device may self-configure for 10/100/1000 BASE-T operation. Set up and operation of 10/100/1000 BASE-T networks are known and beyond the scope of this disclosure. Power over Ethernet (PoE) is automatically transferred between connected equipment according to a power negotiation process described below. No local power supply connection is required because the cascade device 18 is powered by power transmitted over the Ethernet cable from the power sourcing equipment.

The cascade device 18 may be located anywhere along the route of the Ethernet cable as long as no length of cable along the route is more than about 200 meters. For example, to extend the range between a radio controller 10 (containing the power sourcing equipment) and a radio device 14 to 300 meters, the cascade device 18 could be installed 100 meters from the radio controller 10 and 200 meters from the radio device 14.

In some embodiments, the cascade device 18 enables network range extension to any radio device that is compatible with IEEE 802.3af, which is a universal PoE standard for low power network devices. In addition, in some embodiments, the cascade device 18 is compatible with high power standards such as PoE Plus (IEEE 802.3at). For example, 4-pair PoE can be used for devices that require power of 60 Watts or more.

Figure 4:
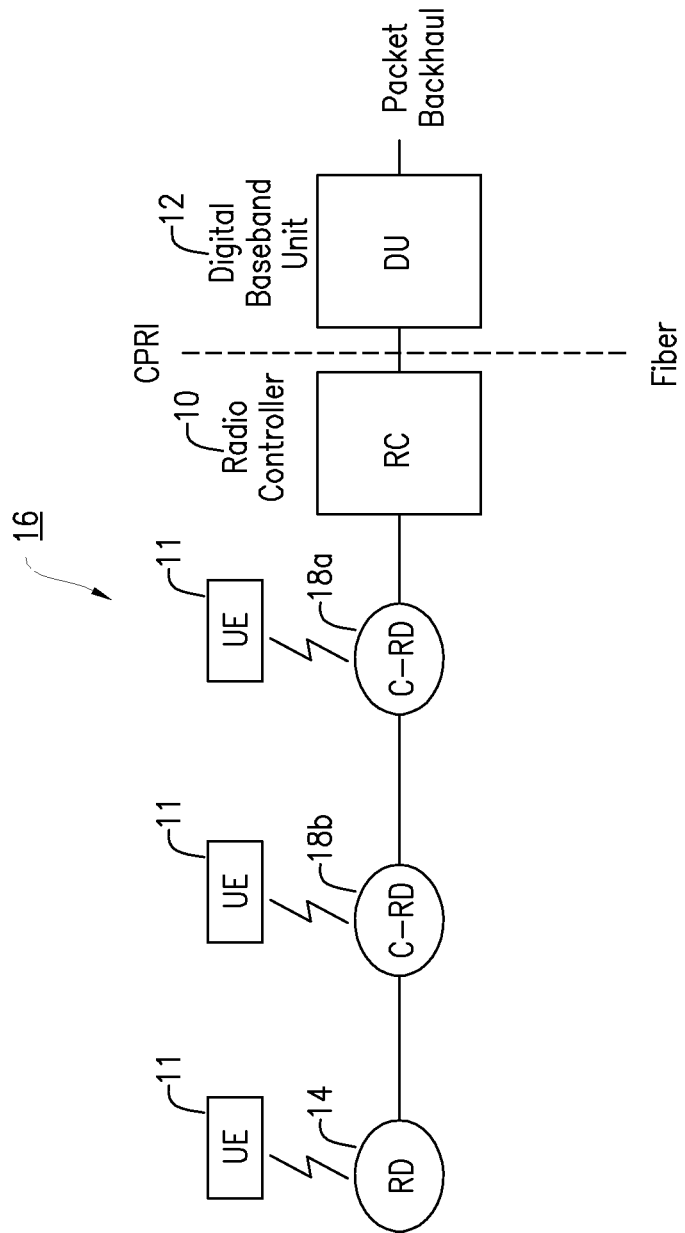
FIG. 4 is a block diagram of a radio system with two cascade devices to further extend the range by which power can be delivered over an Ethernet cable to a radio device constructed in accordance with principles of the present invention.

If an extension of the distance between the radio controller 10 and the radio device 14 beyond 400 meters is desired, more than one cascade device 18 may be installed in series. For example, as shown in FIG. 4, two cascade devices 18a and 18b, referred to collectively as cascade device 18, may be separated from each other by 200 meters and separated from the radio device 14 and the radio controller 10 by 200 meters, respectively, to achieve a total distance from the radio controller 10 to the radio device 14 of about 600 meters. The maximum extension distance depends on how much power is allocated to the radio device and the cascade device and how much power is available from the power sourcing equipment.

Thus, in some embodiments, a radio communication system 16 is provided that includes at least one radio device 14, a radio controller 10 and at least one cascade device 18 interposed between the radio device 14 and the radio controller 10. The radio controller 10 provides power on the Ethernet cable that connects the at least one radio device 14 and the at least one cascade device 18. The cascade device 18 negotiates and amount of power to be allocated to the cascade devices 18 and radio devices 14 in a chain of such devices.

Note that the full bandwidth of the Ethernet network is preserved from end to end since the cascade devices 18 relay signals destined to the end radio device 14. Note also that various cable standards may be employed. Note also that any one or more of the cascade devices 18 may also act as a radio device, i.e., include the functionality of a radio device 14, providing wireless access point functionality. Note further that when the cascade device 18 also includes a radio, the cascade device 18 may broadcast radio signals based on data and signaling received from the radio controller 10, which in turn receives radio signaling and data from the digital baseband unit 12. Conversely, radio signals received wirelessly by the radio device 14 may be communicated via the cascade device 18 and the radio controller 10 to the digital baseband unit 12.

The cascade device 18 negotiates with the radio controller 10 to achieve an allocation of power to the radio device 14. The power negotiation function allows the cascade device 18 to ask for the amount of power it needs in addition to the power needed by downstream devices (devices further from the radio controller 10) such as the radio device 14. In one embodiment, if the total amount of power requested exceeds the capacity of the PSE, the request may be rejected or the amount of power allocated may be determined by the capacity of the PSE.

Figure 5:
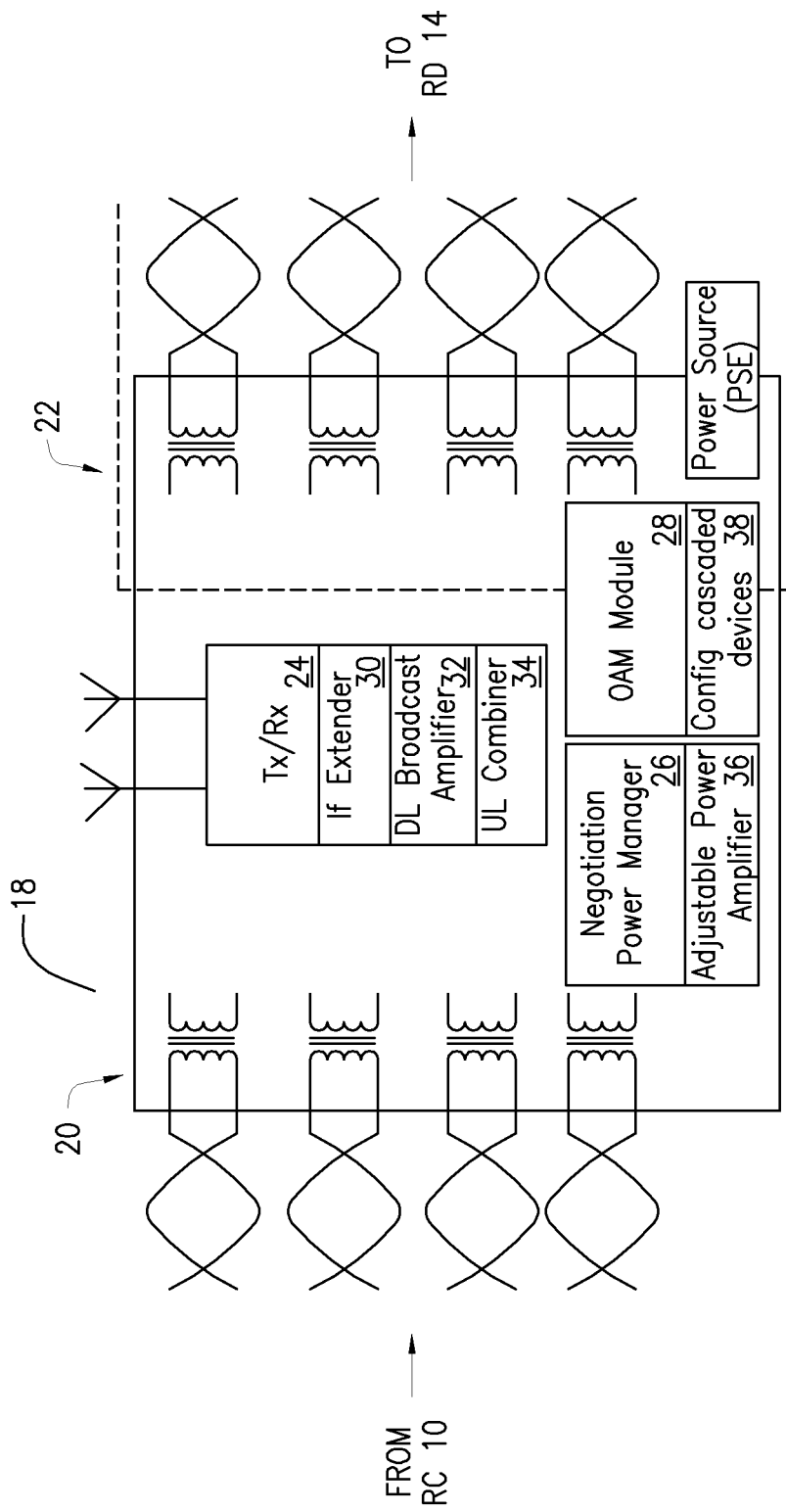
FIG. 5 is a schematic of a cascade device constructed in accordance with principles of the present invention.

FIG. 5 is a schematic and block diagram of one embodiment of a cascade device 18 which receives power and signaling from a radio controller 10 or a cascade radio device via a first Ethernet interface 20 and transmits power and signaling to a radio device 14 or a cascade radio device and any other downstream devices via a second Ethernet interface 22. The cascade device 18 includes a transceiver 24, a power negotiation manager 26 and an OAM module 28. The transceiver 24 is included when the cascade device 18 serves as both a power signal/relay and a radio. The transceiver 24 includes an intermediate frequency (IF) extender 30, a downlink (DL) broadcast amplifier 32 and an uplink combiner 34. The transceiver 24 is configured to communicate wirelessly to user equipment (UE) in the area serviced by the transceiver 24 of the cascade device 18.

A purpose of the IF extender 30 is to provide downlink broadcast amplification and uplink combining capabilities. A purpose of the downlink broadcast amplifier 32 is to amplify the down link signal to be wirelessly transmitted by the downstream radio device in the chain. A purpose of the uplink combiner 34 is to combine signals from radio devices in the chain, e.g., other cascade devices 18 and other radio devices 14 that are to be forwarded to the digital baseband unit 12. The power negotiation manager 26 includes an adjustable power amplifier 36 which is adjustable to amplify power to be transmitted downstream to the radio device 14 at a negotiated level. In one embodiment, the power manager 26 also performs the power negotiation steps described below with reference to FIGS. 7 and 8. The OAM module 28 stores, i.e., records, cascade device OAM configuration data 38, which is played to downstream cascade devices as described above with reference to FIG. 9.

In some embodiments, the radio device 14 includes the hardware and functionality of the cascade device 18, i.e., the devices are the same. In this case, when the device is at the end of the downstream link, e.g., the radio device 14 in FIG. 4, the device functions as a radio device. However, when the device is positioned mid-link, such as cascade device 18a or cascade device 18b in FIG. 4, the device operates and functions as a cascade device 18. In other words, the cascade device 18 may be implemented by modifying a radio device 14 to include the power management functions and OAM functions described herein. Therefore, when a new cascade device is to be added to extend the range of power over Ethernet, the radio device 14 that was at the end of the chain operates as a cascade device 18.

Figure 6:
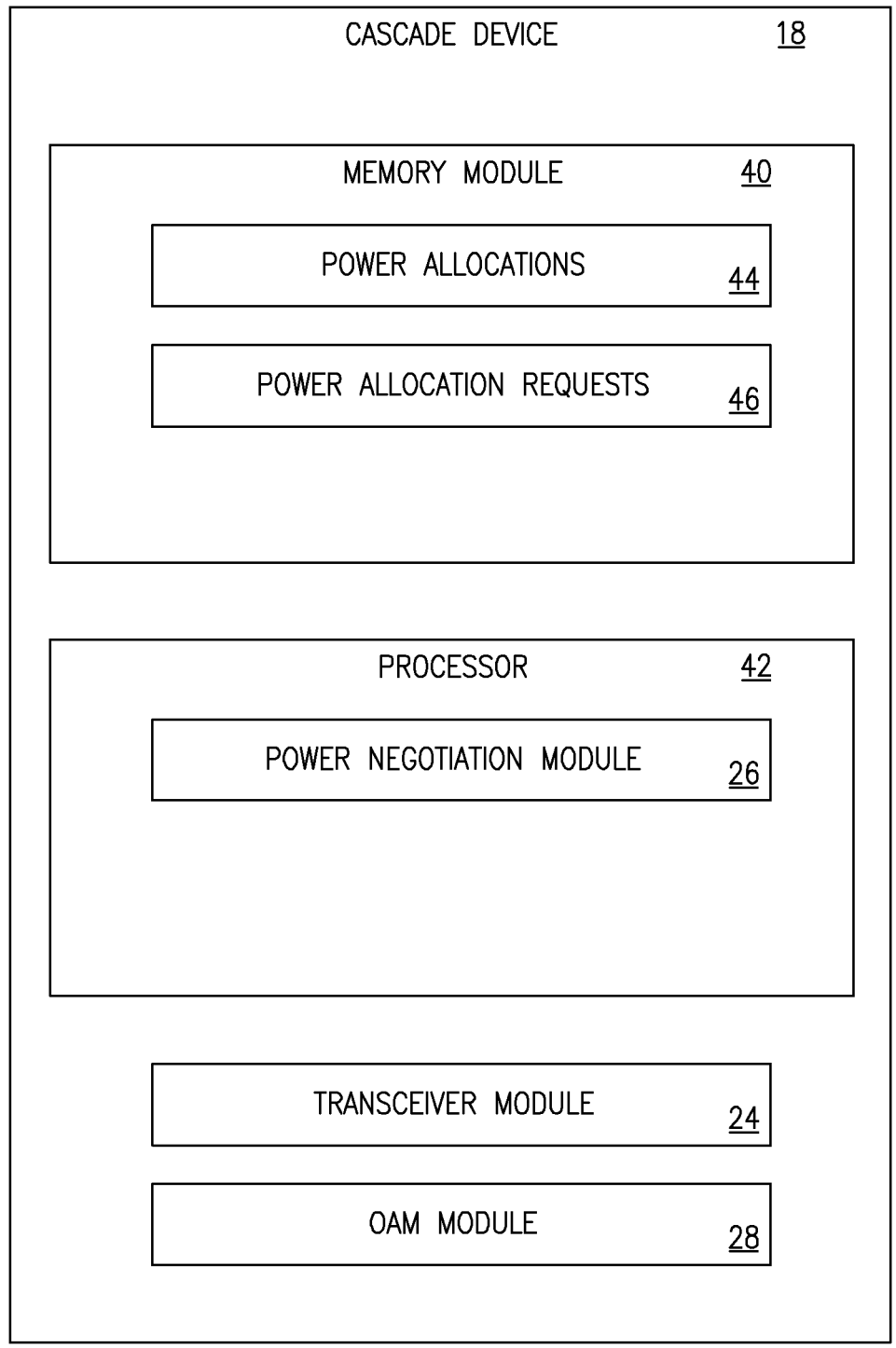
FIG. 6 is a block diagram of a cascade device constructed in accordance with principles of the present invention.

FIG. 6 is a functional block diagram of an exemplary cascade device 18 that employs a memory 40 and processor 42 to implement the cascade device functions described herein. The memory 40 stores power allocations 44 made by the radio controller 10 and power allocation requests 46 generated by the radio device 14 and the cascade device 18. The power allocation requests may include the sum of the power requested by the cascade device 18 and the power requested by additional downstream devices, such as the radio device 14. The processor 42 is programmable to perform the functions of the power negotiation manager 26 of FIG. 8. The functions of the power negotiation module 26 include the steps shown in, and described below with reference to, FIGS. 7 and 8.

Thus, negotiating power allocations to the cascade device 18 and the radio device 14 includes, when the radio device 14 is connected, sending the PSE a total requested power allocation that is the sum of the power allocation requested by the radio device a power allocation requested by the cascade device. When the radio device 14 is disconnected, the cascade device sends to the PSE an updated requested power allocation that includes only the power requested by the cascade device 18.

The cascade device 18 may also include the transceiver 24 and OAM module 28, as described above with reference to FIG. 8. In some embodiments, the OAM module 28 is separate from the processor 42, and in some embodiments, the OAM module 28 is implemented by the processor 42 operating under control of computer instructions. The processor 42 may cause the memory to save OAM configurations to be applied to the cascade device and to additional radio devices to be connected to the cascade device. Thus, the processor may extend the OAM configurations to a next cascade device in the chain. Extending the OAM configurations may include synchronizing cascade devices. Thus, the OAM module 28 is configured to record OAM information that specifies parameters of operation of the radio device 14 and the cascade devices 18 and forwards this OAM information to each successive device in the chain.

Figure 7:
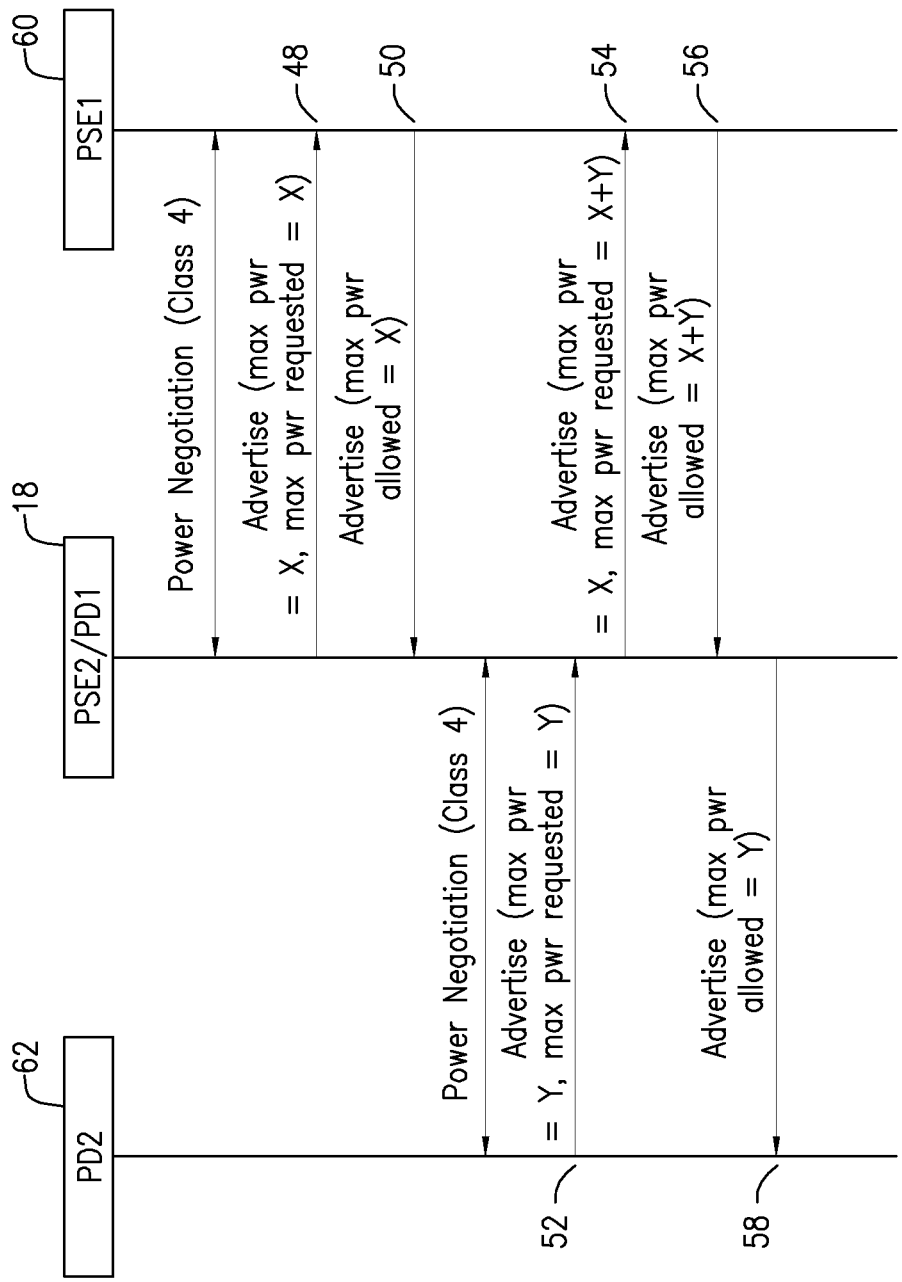
FIG. 7 illustrates a process for negotiating power for a radio device via an intervening cascade device in accordance with principles of the present invention.

A power negotiation process is described with reference to FIG. 7. At start up, the cascade device 18 determines how much power the cascade device 18 needs for itself. In a first step 48, the cascade device 18 advertises to the power sourcing equipment (PSE1) 60—which may typically be the radio controller 10 or another cascade device 18, e.g., the cascade device 18a in FIG. 4—that the cascade device 18 is a power consuming device (PD1) and requests a maximum power of X Watts. In a second step 50, the PSE1 60 advertises to the cascade device 18 that the PSE1 10 is a PSE and that the maximum power of X Watts requested by the cascade device 18 is allocated to the cascade device 18.

When a new power consuming device PD2 62—which may be a radio device 14—or another cascade device 18, e.g., the cascade device 18b in FIG. 4—is connected, in step 52, the PD2 62 device advertises to the cascade device 18 that the PD2 62 requests a maximum power of Y Watts. In response, in step 54, the cascade device 18 advertises to the PSE1 10 that the maximum power requested is X+Y Watts—the sum of the maximum power requested by the PD2 62 and the cascade device 18. In step 56, the PSE1 60 advertises to the cascade device 18 that the maximum power allocated is X+Y Watts. In step 58, the cascade device 18 advertises to the PD2 62 that the cascade device 18 is a PSE and that the maximum power allocated to the PD2 62 is Y Watts. This negotiation of the power to be allocated to the cascade device 18 and to the PD2 62 is performed when the PD2 62 is first connected or when the cascade device 18 is first interposed between the PD2 62 and the PSE1 60. Note, therefore, that the cascade device 18 represents itself as a power consuming device to the PSE 10, and as a power sourcing equipment to the PD2.

Thus, in some embodiments, upon connecting the radio device 14, the cascade device 18 negotiates power allocations for the radio device 14 and the cascade device 18. Negotiating power allocations to the radio device 14 includes receiving a first message from the radio device 14, the first message indicating an amount of power requested by the radio device 14. The cascade device 18 sends to a PSE a second message, where the second message indicates a total amount of power that includes the amount of power requested by the radio device 14 and an amount of power to be allocated to the cascade device 18. In some embodiments, the negotiating power allocations to the radio device 14 from the first PSE further includes receiving at the cascade device 18 from the first PSE a third message. The third message indicates a total allocated power that includes a maximum power allocated to the radio device 14 and a maximum power allocated to the cascade device 18. The negotiating further includes transmitting by the cascade device 18 to the radio device 14 a fourth message, the fourth message indicating the maximum power allocated to the radio device 14.

Referring to FIG. 8, when the power consuming device PD2 62 is removed, in step 64, the cascade device 18 informs to the PSE 1 60 that the requested power is X Watts, rather than X+Y Watts. In response, in step 66, the PSE1 60 advertises to the cascade device 18 that the allocated power is X Watts. This re-negotiation of the power to be allocated from the PSE1 60 is performed when the PD2 62 is removed. Thus, in some embodiments, upon disconnection of the PD2 62, the negotiating includes sending by the cascade device 18 to the PSE1 60 a fifth message requesting a new power allocation from the PSE1 60.

In addition to the advertised messages described above, in some embodiments, the radio controller 10 signals the cascade device 18 whether the radio controller supports 2 or 4 pairs of lines between the radio controller 10 and the cascade device 18. The radio controller 10 may further transmit a message indicating the power standard to which the radio controller 10 adheres. In some embodiments, the available power is based on the number of pairs of lines between the radio controller 10 and the cascade device 18. For example, the radio controller may adhere to a 15 Watt standard (two wire pairs) or a 60 Watt standard (four wire pairs). Likewise, the cascade device 18 may send a message to the radio device 14 indicating the applicable power standard.

In addition, operation, administration and maintenance (OAM) functions are extended from the radio controller 10 to the radio device 14 via the cascade device 18. These OAM functions may include startup and initialization functions, service configuration functions, fault management, software loading and upgrade, and plug and play functions. As shown in FIG. 9, in step 68, an OAM configuration update may be provided to the cascade device 18 from the radio controller 10. The OAM configuration update is recorded, step 70, in an OAM recorder 72 of the cascade device 18. Upon a triggering event, step 74, an OAM player 76 of the cascade device 18 applies the update, step 42, to the radio device 14. A triggering event may include, for example, connection of a cascade device 18 or a radio device 14. In the event that there are more than one cascade device, the OAM information is propagated to each cascade device 18 in the chain.

Figure 10:
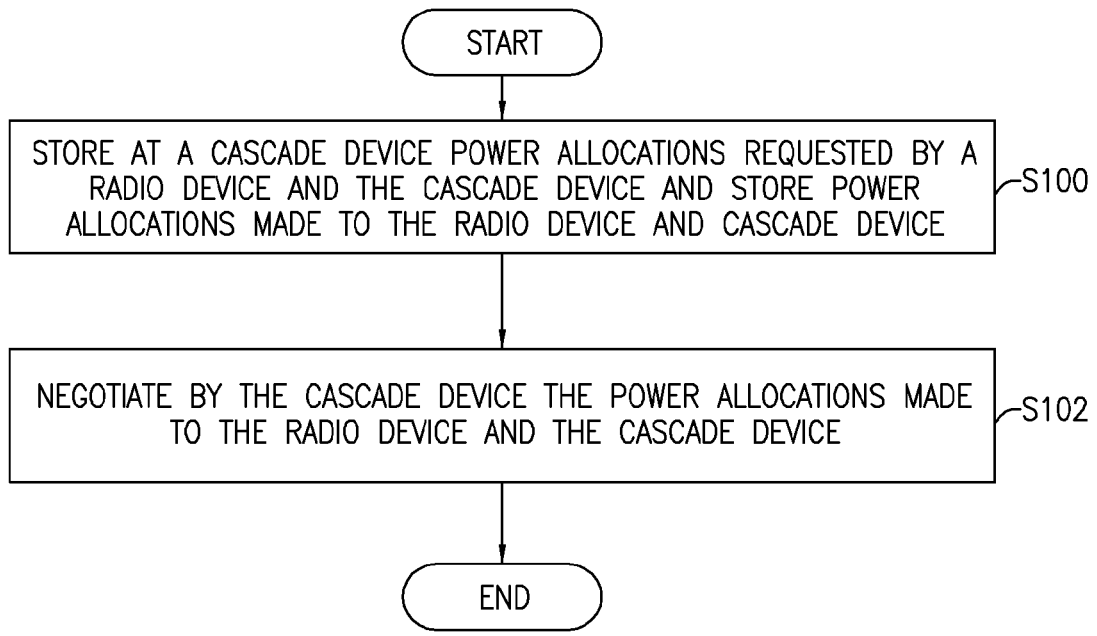
FIG. 10 is a flowchart of an exemplary process for negotiating power for a radio device in which the process is performed at a cascade device.

FIG. 10 is a flowchart of an exemplary process for power negotiation by a cascade device. Power allocations requested by the radio device 14 and the cascade device 18 are stored at the cascade device 18. Power levels actually allocated are also stored at the cascade device (block S100). Also, the power level allocated to the radio device 14 may be stored at the radio device 14. The cascade device 18 negotiates the power allocations made to the radio device 14 and the cascade device 18, as described in FIGS. 5 and 6.

Figure 11:
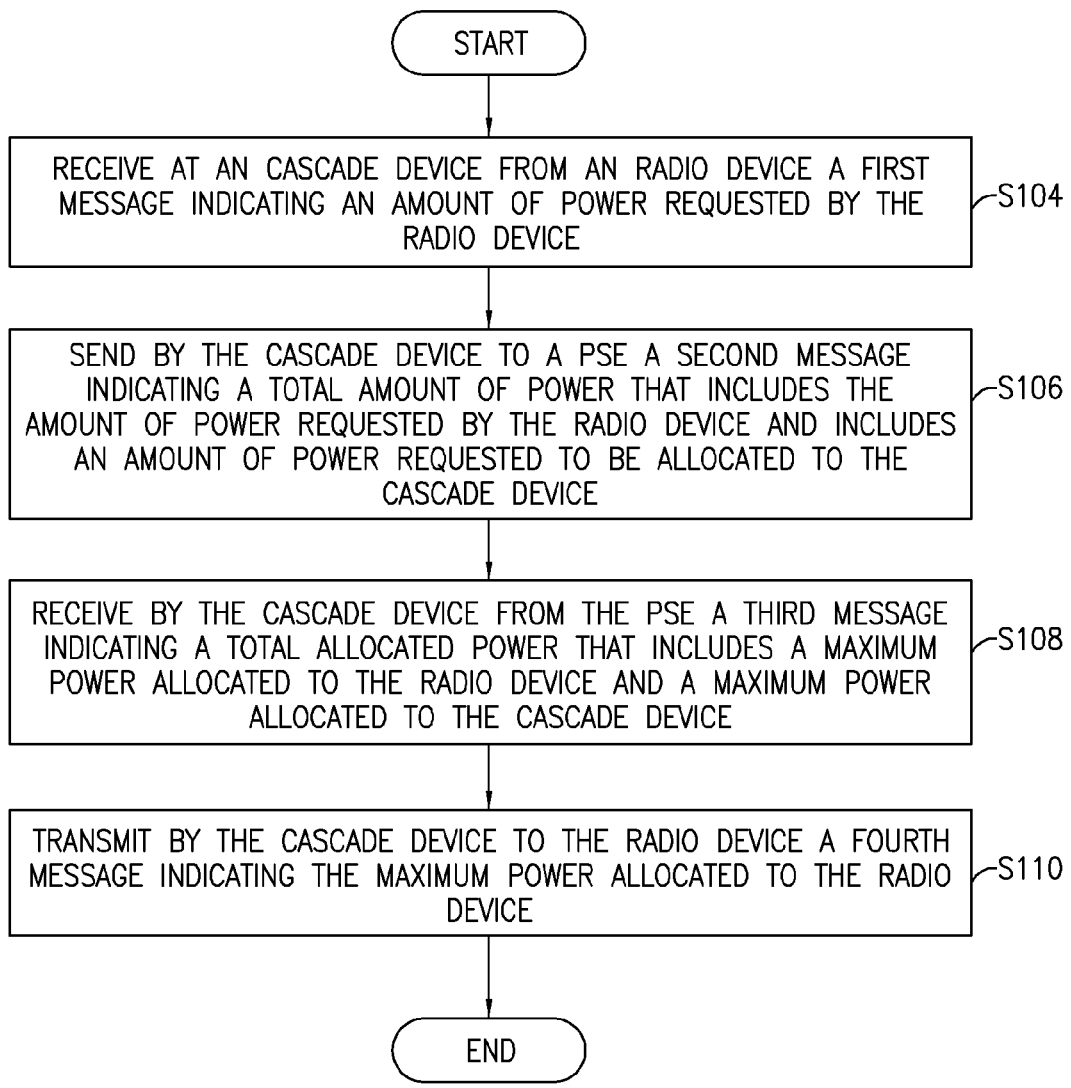
FIG. 11 is a more detailed flowchart of an exemplary process for negotiating power for a radio device in which the process is performed at a cascade device.

FIG. 11 is a more detailed flowchart of an exemplary process for power negotiation by a cascade device 18. The cascade device 18 receives from a radio device 14 a message indicating an amount of power requested by the radio device 14 (block S104). The cascade device 18 sends to a PSE such as the radio controller 10 a second message indicating a total amount of power that includes the amount of power requested by the radio device 14 and an amount of power requested to be allocated to the cascade device 18 (block S106). The cascade device 18 receives from the PSE a third message indicating a total allocated power that includes a maximum power allocated to the radio device 14 and allocated to the cascade device 18 (block S108). The cascade device 18 transmits a fourth message to the radio device 14 indicating the maximum power allocated to the radio device 14 (block S110).

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile tangible storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the invention, which is limited only by the following claims.

What is claimed is:

1. A cascade device configured to negotiate an amount of power to be allocated to a downstream radio device from a power sourcing equipment, PSE, the cascade device configured for communication with the downstream radio device, a digital baseband unit and the PSE, the cascade device comprising:
   a processor configured to:
      negotiate power allocations from the PSE to the radio device and the cascade device; and
   a transceiver configured to:
      combine, via an uplink combiner, communication signals received from a user equipment, UE, with communication signals received from the downstream radio device and transmit the combined communication signals to the digital baseband unit;
      receive communication signals from the digital baseband unit, at least one of which is addressed to the UE and at least one other of which is destined for the downstream radio device; and wirelessly transmit the at least one communication signal addressed to the UE to the UE, and transmit the at least one other communication signal destined to the downstream radio device to the downstream radio device.

2. The cascade device of claim 1, wherein negotiating power allocations to the cascade device and the radio device includes sending to the PSE a total requested power allocation that is a sum of a power allocation requested by the radio device and a power allocation requested by the cascade device.

3. The cascade device of claim 2, wherein, upon disconnecting the radio device, negotiating power allocations includes sending to the PSE an updated total requested power allocation, the updated total requested power allocation including the total requested power allocation minus the power allocated to the radio device.

4. The cascade device of claim 1, wherein negotiating power allocations includes informing the radio device of a maximum power allocated to the radio device.

5. The cascade device of claim 1, wherein:
the processor is further configured to cause the memory to save operation, administration and maintenance, OAM, configurations to be applied to the cascade device and to additional cascade devices to be connected to the cascade device; and
a memory is further configured to store the OAM configurations.

6. The cascade device of claim 5, wherein the processor is further configured to extend the OAM configurations to a next cascade device connected to the cascade device.

7. The cascade device of claim 6, wherein extending the OAM configurations to a next cascade device includes synchronizing the next cascade device with the cascade device.

8. A cascade device configured to negotiate an amount of power to be allocated to a downstream radio device from a power sourcing equipment, PSE, the cascade device configured for communication with the downstream radio device, a digital baseband unit and the PSE, the cascade device comprising:
a power negotiation module configured to negotiate power allocations from the PSE to the radio device and the cascade device;
a transceiver module configured to:
combine, via an uplink combiner, communication signals received from a user equipment, UE, with communication signals received from the downstream radio device and transmit the combined communication signals to the digital baseband unit;
receive communication signals from the digital baseband unit, at least one of which is addressed to the UE and at least one other which is destined for the downstream radio device; and
wirelessly transmit the at least one communication signal addressed to the UE to the UE, and transmit the at least one other communication signal destined to the downstream radio device to the downstream radio device.

9. The cascade device of claim 8, further comprising an operations, administration and maintenance, OAM, module configured to:
record OAM information that specifies parameters of operation of the radio device and the cascade device; and
forward the OAM information to the radio device upon connection of the radio device.

10. A method, in a cascade device, of negotiating power allocations provided via Ethernet cable from a first power sourcing equipment, PSE, to a downstream radio device, the cascade device configured for communication with the downstream radio device, a digital baseband unit and the PSE, the method comprising:
negotiating by the cascade device the power allocations from the PSE made to a radio device and the cascade device; and
combining, via an uplink combiner, communication signals received from a user equipment, UE, with communication signals received from the downstream radio device and transmit the combined communication signals to the digital baseband unit;
receiving communication signals from the digital baseband unit, at least one of which is addressed to the UE and at least one other which is destined for the downstream radio device; and
wirelessly transmitting the at least one communication signal addressed to the UE to the UE, and transmit the at least one other communication signal destined to the downstream radio device to the downstream radio device.

11. The method of claim 10, wherein negotiating power allocations to the cascade device and the radio device includes sending to the PSE a total requested power allocation that is a sum of a power allocation requested by the radio device and a power allocation requested by the cascade device.

12. The method of claim 11, wherein, upon disconnecting the radio device, negotiating power allocations includes sending to the PSE an updated total requested power allocation, the updated total requested power allocation including the total requested power allocation minus the power allocated to the radio device.

13. The method of claim 10, wherein negotiating power allocations includes informing the radio device of a maximum power allocated to the radio device.

14. The method of claim 10, wherein, upon connecting the radio device, negotiating power allocations to the radio device includes receiving a first message from the radio device, the first message indicating an amount of power requested by the radio device.

15. The method of claim 14, wherein negotiating power allocations to the radio device from the first PSE includes sending by the cascade device to the first PSE a second message, the second message indicating a total amount of power that includes the amount of power requested by the radio device.

16. The method of claim 15, wherein the total amount of power includes a requested amount of power to be allocated to the cascade device.

17. The method of claim 15, wherein the negotiating power allocations to the radio device from the first PSE further includes:
receiving at the cascade device from the first PSE a third message, the third message indicating a total allocated power that includes a maximum power allocated to the radio device and a maximum power allocated to the cascade device; and
transmitting by the cascade device to the radio device a fourth message, the fourth message indicating the maximum power allocated to the radio device.

18. The method of claim 17, further comprising, upon disconnection of the radio device, sending by the cascade device to the first PSE a fifth message requesting a new power allocation from the first PSE.

19. The method of claim 10, further including:
recording by the cascade device operation, administration and maintenance, OAM, information concerning configuration of the radio device; and
sending by the cascade device to the radio device the OAM information when the radio device is connected to the cascade device.

* * * * *